(12) United States Patent
Gramo et al.

(10) Patent No.: US 11,601,698 B2
(45) Date of Patent: Mar. 7, 2023

(54) INTELLIGENT SYNCHRONIZATION OF MEDIA STREAMS

(71) Applicant: SUPER LEAGUE GAMING, INC., Santa Monica, CA (US)

(72) Inventors: Brian Gramo, Santa Monica, CA (US); Arthur Kmbikyan, Santa Monica, CA (US); David Steigelfest, Santa Monica, CA (US)

(73) Assignee: SUPER LEAGUE GAMING, INC., Santa Monica, CA (US)

( * ) Notice: Subject to any disclaimer, the term of this patent is extended or adjusted under 35 U.S.C. 154(b) by 60 days.

(21) Appl. No.: 17/217,863

(22) Filed: Mar. 30, 2021

(65) Prior Publication Data

US 2022/0321933 A1    Oct. 6, 2022

(51) Int. Cl.
| | |
|---|---|
| *H04N 21/242* | (2011.01) |
| *A63F 13/35* | (2014.01) |
| *H04N 21/234* | (2011.01) |
| *H04N 21/233* | (2011.01) |

(52) U.S. Cl.
CPC ........... *H04N 21/242* (2013.01); *A63F 13/35* (2014.09); *H04N 21/233* (2013.01); *H04N 21/23406* (2013.01)

(58) Field of Classification Search
CPC .............. H04N 21/242; H04N 21/233; H04N 21/23406; A63F 13/35
See application file for complete search history.

(56) References Cited

U.S. PATENT DOCUMENTS

| | | | |
|---|---|---|---|
| 10,091,559 B2* | 10/2018 | Goslin ............... | H04N 21/4826 |
| 2011/0302442 A1* | 12/2011 | Garrett ................ | H04N 21/482 |
| | | | 713/400 |
| 2016/0381111 A1* | 12/2016 | Barnett .............. | H04N 5/23206 |
| | | | 709/231 |
| 2019/0037268 A1* | 1/2019 | Occhialini ....... | H04N 21/43635 |

* cited by examiner

*Primary Examiner* — Nicholas T Corbo
(74) *Attorney, Agent, or Firm* — Polsinelli LLP (57) ABSTRACT

Systems and methods for intelligent synchronization of media streams are provided. A server may receive streams corresponding to an interactive session and sent over a communication network from user devices in the interactive session. A predetermined attribute may be identified as present in each of the streams, but received at different times by the server. The server may determine a time difference between a time that a predetermined attribute in a first stream of the streams was received and a time that the predetermined attribute in a second stream of the streams was received. The first stream and the second stream may then be synchronized using the time difference and provided to a recipient device.

21 Claims, 6 Drawing Sheets

RECEIVE BY A SERVER A PLURALITY OF STREAMS CORRESPONDING TO AN INTERACTIVE SESSION, THE PLURALITY OF STREAMS SENT OVER A COMMUNICATION NETWORK FROM A PLURALITY OF USER DEVICES IN THE INTERACTIVE SESSION
*402*

IDENTIFY A PREDETERMINED ATTRIBUTE PRESENT IN EACH STREAM OF THE PLURALITY OF STREAMS, WHEREIN THE PREDETERMINED ATTRIBUTE WITHIN EACH STREAM IS RECEIVED AT DIFFERENT TIMES BY THE SERVER
*404*

DETERMINE A TIME DIFFERENCE BETWEEN A TIME THAT A PREDETERMINED ATTRIBUTE IN A FIRST STREAM OF THE PLURALITY OF STREAMS WAS RECEIVED BY THE SERVER AND A TIME THAT THE PREDETERMINED ATTRIBUTE IN A SECOND STREAM OF THE PLURALITY OF STREAMS WAS RECEIVED BY THE SERVER
*406*

SYNCHRONIZE THE FIRST STREAM AND THE SECOND STREAM USING THE TIME DIFFERENCE
*408*

PROVIDE THE SYNCHRONIZED FIRST AND SECOND STREAM TO A PRODUCTION SERVER
*410*

INTELLIGENT SYNCHRONIZATION OF MEDIA STREAMS

BACKGROUND OF THE INVENTION

1. Field of the Invention

The present technology pertains to intelligently synchronizing multiple media streams, such as media streams received from a video game being streamed, and more particularly, to outputting a production stream based on the multiple synchronized media streams.

2. Description of the Related Art

Streaming content can be displayed from various perspectives in an in-stream digital or virtual environment. A user may engage in an interactive session, for example, by using their user device to execute a content title. Such execution may result in generation of a digital environment, as well as digital characters or avatars controlled by user input. Game titles, for example, provide a digital environment in which multiple users (e.g. by way of digital characters or avatars) can interact with each other's character(s) and with various other objects and entities in the digital environment. Further, multiplayer games may be associated with as many different in-game or in-stream views as there are players. That is because many multiplayer game titles may provide each player with a specific view (e.g., respective first-person view associated with a user character or avatar) of the in-game digital environment.

Where multiple users are interacting in the digital environment of a content title, therefore, different sets of data—e.g., user inputs, user controls, resulting display data (e.g., their respective characters and avatars), associated metadata—may be shared with other users, including users who may only be spectating (e.g., without an associated character) in the digital environment. Thus, multiple user devices may each be generating a different media stream, which may be shared with other devices over communication networks. The other devices may include user devices of other users participating in the digital environment, user devices of spectators who are not participating in the digital environment, and various databases and servers that may respectively store, process, and further distribute the streams.

A single multiplayer game session may be associated multiple different streams (e.g., with different perspectives of a digital environment), amounting to dozens, hundreds, or even thousands of different streams. Depending on differences between each user's devices, communication networks, and other conditions, different amounts of lag or time delay may be experienced in relation to each different stream. The various differences in hardware and conditions around each stream's generation and communication may introduce the lag or time delay into the stream relative to other streams associated with the same interactive session. As such, the streams may be received by a recipient device with different amounts of lag or time delay.

Conventional platforms may employ human editors who manually edit and synchronize streams. Processing streams manually can be challenging, however, when there are numerous streams each associated with different data, and the human editors cannot practically process such streams efficiently, consistently, or granularly when there are numerous streams each having different amounts of lag or time delay. For example, the human editor(s) may need to access and watch each of the individual streams corresponding to the different available perspectives in order to determine how to edit the respective stream. Such involvement may be increasingly time-consuming and difficult, however, where there are many different streams, in-stream events, and perspective views to evaluate. In addition, human editors may not be able to comprehend and evaluate all the data included in each stream without the stream being required to undergo some translation, conversion, or other time- and resource-heavy process.

Therefore, there is a need in the art for improved systems and methods of intelligent synchronization of media streams.

SUMMARY OF THE CLAIMED INVENTION

Embodiments of the present invention include systems and methods for intelligent synchronization of media streams. A server may receive streams corresponding to an interactive session and sent over a communication network from user devices in the interactive session. A predetermined attribute may be identified as present in each of the streams, but received at different times by the server. The server may determine a time difference between a time that a predetermined attribute in a first stream of the streams was received and a time that the predetermined attribute in a second stream of the streams was received. The first stream and the second stream may then be synchronized using the time difference and provided to a recipient device.

DETAILED DESCRIPTION

Embodiments of the present invention provide systems and methods for intelligent synchronization of media streams, which can be used to address the limitations of conventional gaming platforms that are unable to efficiently process high volumes of media streams. During an interactive session (e.g., online video gaming session), user devices associated with gamers participating in the session can generate and send a respective data stream to a recipient device. Each media stream can include various types of digital data known in the art, including a combination of video and audio content corresponding to what the gamer sees and hears in a digital environment while participating in the session. In various embodiments, a media stream may further include game data (e.g., scores, character status, virtual objects), as well as metadata associated with the respective stream. The media streams from the same interactive session may be provided to a recipient device for access, display, or further processing. In some embodiments, the recipient device may be a stream production server that generates a production stream by combining different selected portions of some or all of the session streams into one stream.

Due to a variety of reasons (e.g., network latency, bandwidth limits), the streams may not be transmitted or received in sync with one another when received from the multiple user devices in the session. In some instances, different amounts of lag or delay time may be present in different streams. The streams may be sent to a stream processing server, which analyzes each of the received streams to identify a predetermined attribute present in each stream. Information regarding such attribute may be stored in memory and used to identify when the predetermined attribute is present in a stream, as well as identify a location within a timeline of the stream where the predetermined attribute appears. The predetermined attribute may be a common audio cue, a visual cue, an in-game or in-stream cue, or other type of markers within a data stream timeline. In some instances, the stream processing server can further include a stream analysis engine that is configured to identify predetermined attributes, as well as improve attribute identification and identify new attributes over time using artificial intelligence (AI) means.

Based on the identified predetermined attribute and the respective locations in each stream where the predetermined attribute appears, the stream processing server can determine one or more time differences (e.g., lag or time delay) between one stream relative to another streams. Using the identified time differences, the stream processing server can synchronize the multiple streams with one another before the streams are provided to another device. As such, the synchronized streams may be received by the other device, which may immediately access different combinations of the selected streams in synch without undertaking the time and resource-intensive tasks of analyzing and synchronizing the streams.

In some embodiments, the stream processing server can synchronize the streams by building one or more buffers for streams identified as having lag or delay times. The size of the buffer for each respective stream can correspond to a time difference (e.g., relative to the stream having the longest lag or delay time). A portion of a stream corresponding to the relative time difference may be input into the buffer, for example, and then retrieved or output from the buffer in a timed manner so as to be in sync with the other stream(s). In this way, the stream processing server can coordinate individual buffering of differently-sized portions of different streams, as well as individually timed retrieval and output of the buffered portions. As output, the streams may be synchronized, and a common attribute may thereafter appear at a same location within each respective stream timeline. Assuming no lag between the stream processing server and the recipient device, the recipient device may therefore receive (e.g., and/or see, hear, or otherwise detect) the common attribute in each output stream at the same time.

Various embodiments may include use of a cache by the stream processing server. In such embodiments, the stream processing server may write each of the multiple received streams to a stream cache. Using the time differences, the stream processing server can determine an amount of time relative to a playback time for each of the multiple streams to be read from the cache so that their respective predetermined attribute (and therefore each stream) are synchronized. The stream processing server may thereafter sequentially read each stream from the cache in accordance with the respective amount of time relative to the playback time. Thus, the streams are read from the cache in a synchronized manner.

Figure 1:
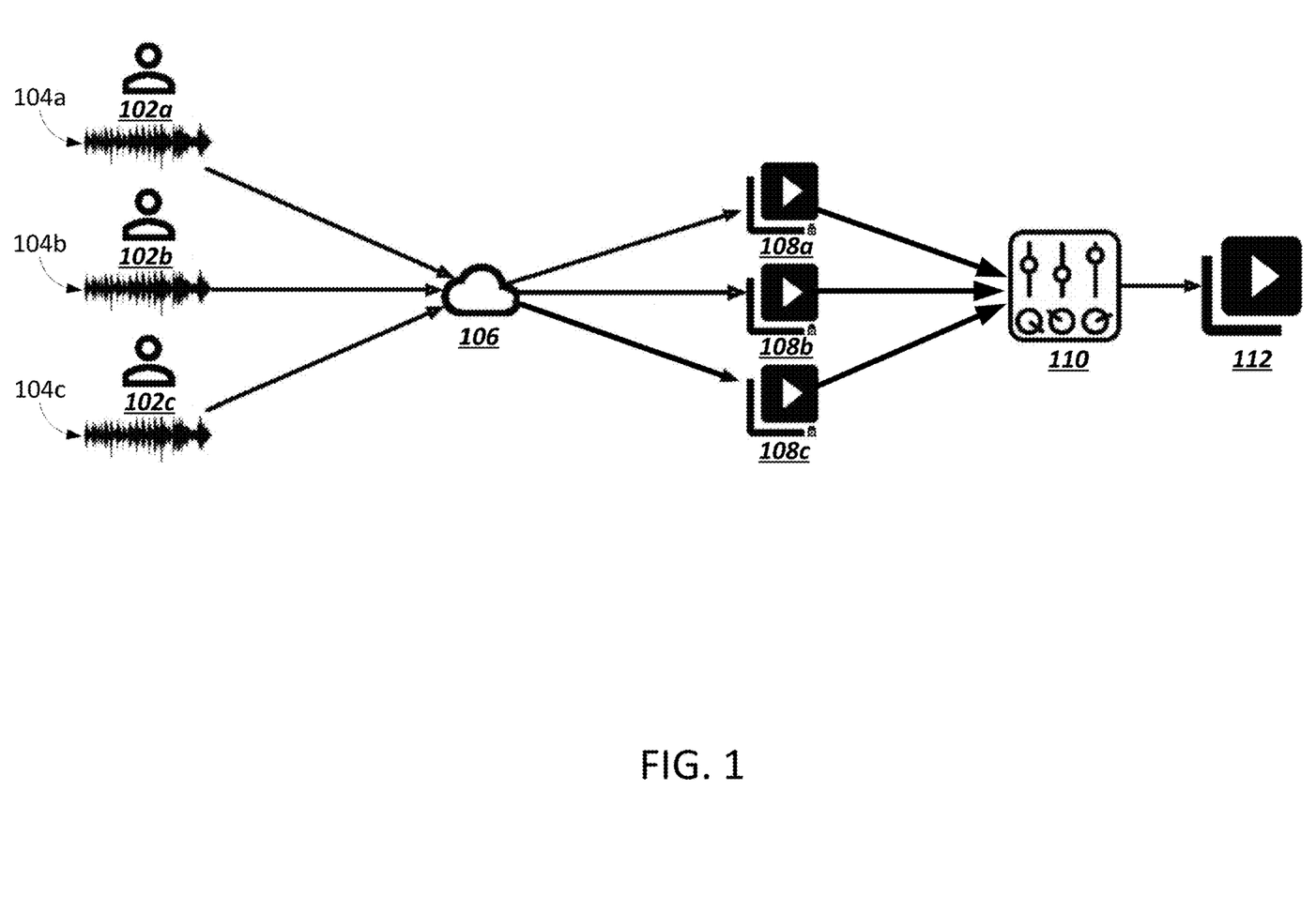
FIG. 1 illustrates an exemplary network environment in which a system for intelligent synchronization of media streams may be implemented.

FIG. 1 illustrates an exemplary network environment in which a system for intelligent synchronization of media streams may be implemented. The network environment may include one or more user devices 102a-c each generating and providing a respective stream 104a-c to a stream processing server 106 communicatively coupled to a recipient device 110 (e.g., stream production server, spectator device). The stream processing server 106 receives streams 104a-c from user devices 102a-102c. The stream processing server 106 outputs processed streams 108a-108c, which are synchronized with one another. The stream production server 110 receives the processed streams 108a-108c and generates a production stream 112 based on the processed streams.

The devices of the network environment of FIG. 1 may communicate using one or more communication networks known in the art, including any local, proprietary network (e.g., an intranet) and/or that may be a part of a larger wide-area network. The communications network may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network allows for communication between the various components of network environment.

User devices 102a-c may be inclusive of any number of different electronic user devices, such as general purpose computers, mobile phones, smartphones, personal digital assistants (PDAs), portable computing devices (e.g., laptop, netbook, tablets), desktop computing devices, handheld computing device, game consoles, or any other type of computing device capable of communicating over communication network. User devices 102a-c may also be configured to access data from other storage media, such as memory cards or disk drives as may be appropriate in the case of downloaded services. User device 102a-c may include standard hardware computing components such as network and media interfaces, non-transitory computer-readable storage (memory), and processors for executing instructions that may be stored in memory. In some embodiments, user devices 102a-c may correspond to the computing device illustrated and described in relation to FIG. 5. While FIG. 1 illustrates three user devices 102a-c, an interactive session may include as few as one user device, as well as many more (e.g., dozens, hundreds, thousands, etc.).

The user devices 102a-c may generate and provide respective streams 104a-c (e.g., audio-visual streams with associated game data, application data, or metadata) during an interactive session (e.g., online multiplayer game session). A user associated with each of the user devices 102a-102c may participate in the gaming session by playing the game or otherwise participating in an interactive associated with another type of content or application title. In some embodiments, the title may be hosted by a gaming platform server or an application server (not pictured). Individual streams 104a-c may be generated based on each of the user device 102a-c interactions with the content or application title during an interactive session. For example, a generated stream 104 can be a stream of an audio-visual video display of the virtual environment as presented on a respective user device 102a-c. In some embodiments, the generated streams 104a-c can further include other data captured by the user device 102a-c, such as audio of the user captured by a microphone communicatively coupled to the user device 102a-c or camera video of the user captured by a camera communicatively coupled to the user device 102a-c. Other sensors associated with user dev ice 102a-c may also be used to capture data regarding the real-world user and their respective surrounding real-world environment. In addition, the user devices 102a-c may also be configured to track game data regarding different players (e.g., scores, ranks), avatars or virtual characters (e.g., health status, abilities), virtual objects, and other conditions in the virtual environment and include such game data in their respective streams 104a-c.

The streams 104a-c may be sent over a communication network to (or intercepted by) the stream processing server 106. As illustrated in the example of FIG. 1, each of the streams 104a-c may be received by the stream processing server 106. Because each stream can be sent using a different device, using a different network connection, and subject to different conditions, the streams may include different amounts of lag or delay time in reaching the stream processing server 106.

Stream processing server 106 and recipient device 110 may be inclusive any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. Stream processing server 106 and recipient device 110 may correspond to a computing device as illustrated and described in relation to FIG. 5. In some embodiments, stream processing server 106 may be a cloud server associated with one or more virtual machines executable to perform the functionalities described herein. The virtual machines may be added, configured, and removed and re-tasked as needed to efficiently allocate resources to processing streams associated with a particular session.

In various embodiments, the stream processing server 106 may be configured to process the incoming streams 104a-c from user devices 102a-c in order to output synchronized streams 108a-108c to a recipient device 110. Different ways to synchronize the streams are discussed in further detail in relation to FIGS. 3A-D. Such synchronization may include evaluating each of the streams to identify a predetermined attribute present at a location within the timeline of each of the streams as received by stream processing server 106. A location of the attribute within one stream may be offset by a certain amount of lag or time delay relative to the location of the attribution within another stream. For example, stream processing server 106 may identify that one stream exhibits no lag or the least amount of lag (e.g., whose predetermined attribute is received first by the stream processing server 106). Other streams (e.g., whose respective predetermined attribute is received later by the stream processing server 106) may be identified as exhibiting different amounts of lag or time delay according to when their respective predetermined attribute is received relative to the stream exhibiting little to no lag.

The recipient device 110 may include a stream production server 110 that processes the synchronized streams 108a-108c to generate one or more production streams. For example, the stream production server 110 can edit together various portions of the processed streams 108a-c to generate a production stream that features video and/or audio from the streams 108a-c. The production stream may display the interactive session along the same timeline as the output streams 108c-a, but may include different portions thereof to provide different viewpoints, perspectives, angles, etc. associated with the different user devices 102a-c within a single stream. In the illustrated example of FIG. 1, the stream production server 110 may be separate from the stream processing server 106. In some implementations, however, both the stream production server 110 and the stream processing server 106 may be components of a single server (e.g., cloud server), distinct servers, distributed servers, etc. Stream processing server 106 and stream production server 110 may be associated with different sets of virtual machines tasked to perform the functionalities described herein.

Figure 2:
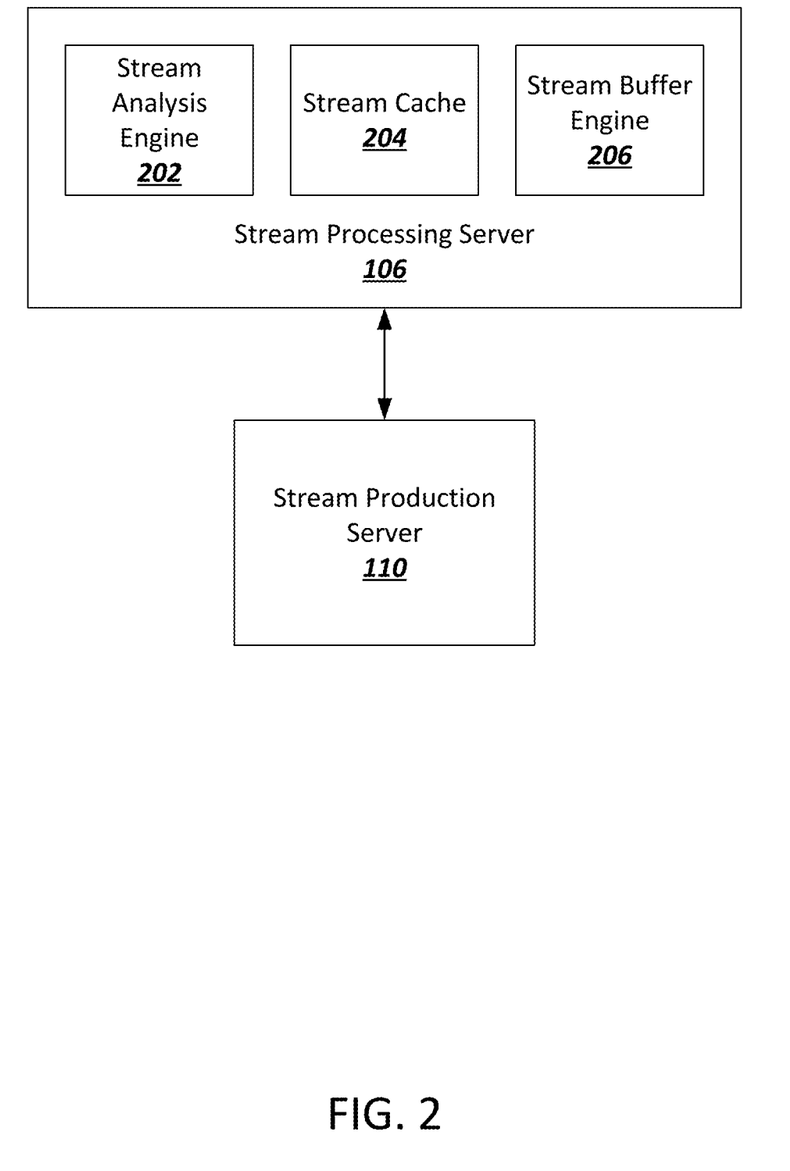
FIG. 2 is a block diagram of an exemplary system for intelligent synchronization of media streams.

FIG. 2 is a block diagram of an exemplary system for intelligent synchronization of media streams. Such a system may include the stream processing server 106 and the stream production server 110 discussed above. As illustrated, the stream processing server 106 may include a stream analysis engine 202, a stream cache 204, and a stream buffer engine 206.

The stream analysis engine 202 takes as input the streams 104a-c as generated and delivered from user devices 102a-c and identifies a predetermined attribute present in each stream. For example, the predetermined attribute can be a visual cue, an audio cue, or an in-game cue or other type of in-stream cue. For example, a visual cue can be a particular video segment, image, or series of images within the streams that uniquely identify a location within the timeline of the respective stream as received by the stream processing server 106. A particular video segment can be a certain scene that is present in the media content of the interactive session from which the streams 104a-c originated. For example, the particular video segment from the media content can be a cut-scene or loading screen of a particular game (e.g., an in-game event such as encountering a certain character, meeting a benchmark or achievement, etc.). An audio cue may include in-game sound, sound effects, audio notifications, or audio from teammates, competitors, or other players. For example, if a game includes a sound at a certain point in each round or level of the game, the stream analysis engine 202 can identify the sound as a predetermined attribute.

The streams 104a-c can further include an in-game cue, which can be an attribute that is specific to the media content of the interactive session. For example, if a game includes a countdown timer for all participants, then the stream analysis engine 202 can identify the timer, which can serve as a predetermined attribute that is common to each of the incoming streams 104a-c. As another example, the game may include a lobby or other waiting room where players or their characters wait before or after the game. In some implementations, the stream analysis engine 202 can identify particular events that occur to a player as an in-game cue. For example, a particular event can be a player losing the game, or the number of players remaining being decremented as a result of the player losing the game.

The stream analysis engine 202 can intelligently determine the types of cues to search for in an incoming stream based on information about the interactive session. For example, if the interactive session is a game, the information about the game can include the name of the game, the typical duration of the game, particular images or sounds associated with the game, or particular video segments associated with the game.

As an example of identifying a predetermined attribute, such as a video cue, the stream analysis engine 202 can analyze one or more images or video segments of one of the incoming streams 104a-c to first determine a potential visual cue. The stream analysis engine 202 can determine whether the potential visual cue is present in each of the other incoming streams, and if the potential visual cue is present in the other incoming streams, then the stream analysis engine 202 confirms that the potential visual cue is a predetermined attribute that is common to each of the incoming streams. If instead the stream analysis engine 202 determines that the potential cue is missing from at least one of the incoming streams, then the engine can consider a next potential cue that it searches for in the incoming streams 104a-c. The stream analysis engine 202 can follow a similar process of identifying a potential cue in a first incoming stream, and searching for the potential cue in the other incoming streams, to determine audio or in-game cues.

A predetermined attribute may be inclusive of any type of attribute associated with a stream that can be identified in accordance with stored rules. Each predetermined attribute may be associated with rules specifying certain visual, audio, in-game, or other stream-related data identified as likely to uniquely identify a location within a session stream. In addition, the rules may further specify how to identify each attribute, as well as an associated accuracy or confidence level. Over time, the rules may be updated and refined by applying artificial intelligence and machine learning techniques to feedback data provided by stream production server 110 or other recipient device 110. Such feedback data may be inclusive of production decisions made at stream production server 110. Such data may be aggregated in conjunction with data regarding the output streams 108a-c to identify patterns and trends. The identified patterns and trends may further be used to update attribute definitions, detection, associated accuracy or confidence levels associated with the rules. In addition, the patterns and trends may be used to generate new rules regarding new attributes. Such new rules may thereafter be used in the current or subsequent sessions, as well as further updated and refined over time.

Figure 3A:
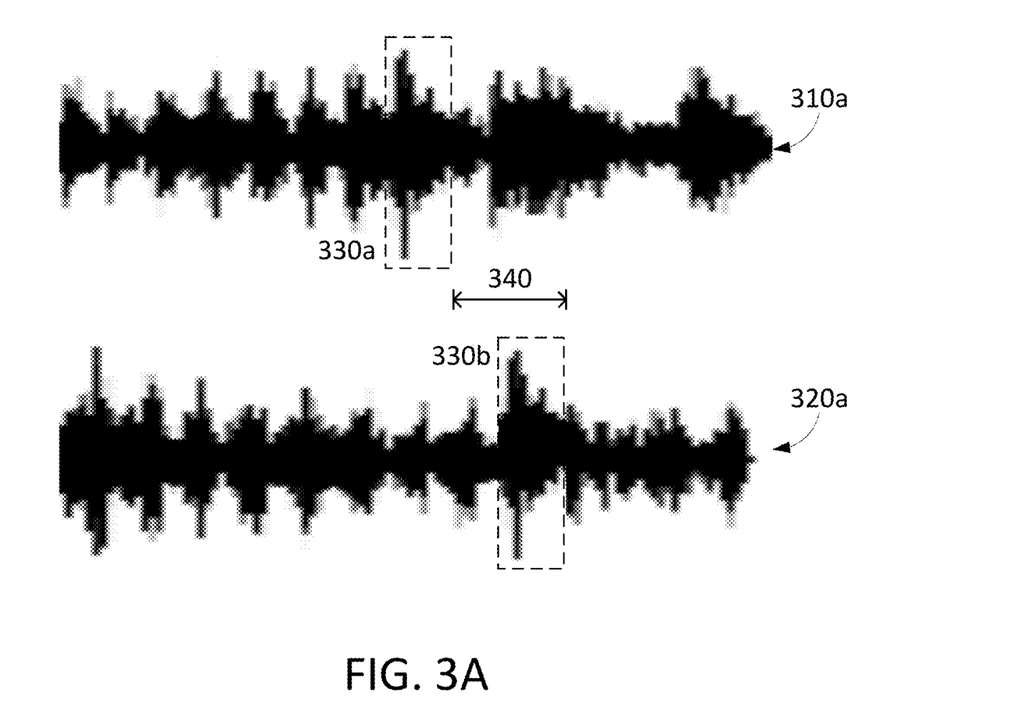
FIG. 3A illustrates exemplary signal patterns associated with two different streams that may be received by a system for intelligent synchronization of media streams.
Figure 3B:
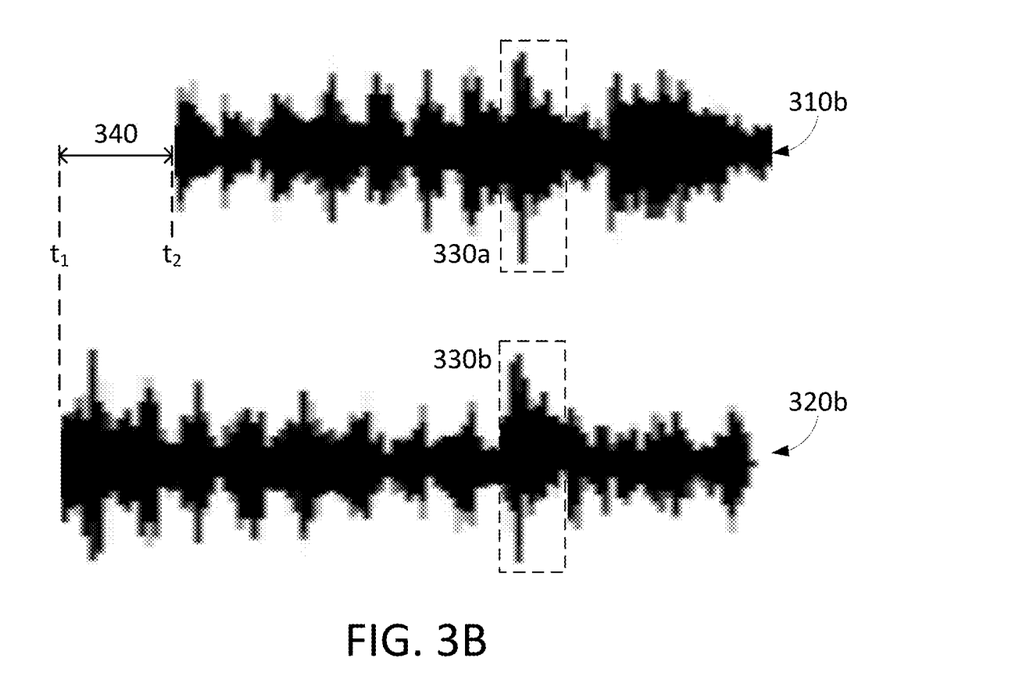
FIG. 3B illustrates exemplary signal patterns associated with the two different streams of FIG. 3A following synchronization by a system for intelligent synchronization of media streams.

FIG. 3A illustrates exemplary signal patterns associated with two different streams 310 and 320 that may be received by a system for intelligent synchronization of media streams, and FIG. 3B illustrates exemplary signal patterns associated with the two different streams 310 and 320 of FIG. 3A following synchronization by a system for intelligent synchronization of media streams. For simplicity, FIGS. 3A-B respectively illustrate two streams 310 and 320 that may be received and synchronized by stream processing server 106. As discussed herein, the computing resources of the stream processing server 106 (e.g., virtual machines in the cloud) can be scaled up or down as needed to process hundreds or thousands of incoming streams.

In the example of FIG. 3A, streams 310a and 320a may each be analyzed by stream processing server, which generates respective signal patterns depicting audio variations during a timeline of the streams. Stream processing server 106 may have identified a common audio cue 330a and 330b within each stream 310 and 320. For example, the audio cues 330a and 330b can be a sound having a unique pattern detected within the signal patterns for streams 310 and 320. As illustrated, the locations of the audio cues 330a-b within the timeline of each of the streams may be offset by a certain time difference 340.

The stream analysis engine 202 can receive the incoming streams 310 and 320 from user devices 102a-c and analyze the streams to determine that both include the audio cue 330. The stream analysis engine 202 can also determine a time difference 340, which is the time difference between the audio cues 330a and 330b. In the example of FIG. 3A, the time difference is measured from corresponding ends of the audio cues 330a and 330b, although it is possible to measure the time difference from another common point of the audio cues 330a and 330b. After determining the audio cues 330a and 330b, and the time difference 340, the stream processing engine 106 can input different portions of the individual streams to either the stream cache 204 or the stream buffer engine 206.

For example, as illustrated in FIG. 3B, the determined time difference 340 may be introduced into streams 310b. With the introduced time difference, stream 310b and 320b may be output to recipient device 110 in synchronized manner. The stream processing server 106 may output the streams by reading the streams stored in the stream cache 204 once the time difference 340 has been introduced. For example, the stream processing server 106 begins reading the stream 320b from the stream cache 204 at a playback time, denoted $t_1$. The stream processing server 106 then waits for the duration of time equal to the time difference 340 before beginning to read the stream 310b from the stream cache 204 at time t2. Accordingly, the streams 310b and 320b are synchronized, as evidenced by the audio cues 330a and 330b of the streams being aligned.

In one implementation, the stream processing server 106 can write at least a respective portion of each individual stream to the stream cache 204. For example, when the stream processing server 106 begins receiving the incoming streams 310a and 320a, the stream processing server 106 can continuously write the streams to the stream cache 204, while the stream analysis engine determines a time difference based on the audio cues 330a and 330b. To synchronize the streams stored in the stream cache 204, the stream processing server 106 can read each stream from the stream cache such that the resulting output streams from the stream cache are synchronized. The stream cache 204 uses the one or more time differences to determine when to begin reading a particular input stream from the stream cache.

In some implementations, the stream processing server 106 reads and writes the received streams 310a and 320a to and from the stream cache 204 without altering the streams. Therefore, when the stream cache 204 is used to synchronize streams, the streams read from the stream cache 204 are the same streams that are written to the stream cache. The introduced time difference and resulting synchronization may be based on the timing at which each of the streams may be read from stream cache 204. That is, in the example of FIG. 3B, when synchronization is performed by the stream cache 204, the streams 310a and 310b are identical, while the streams 320a and 320b are identical. However, the streams 310*b* and 320*b* are synchronized in time, while the streams 310*a* and 320*b* are not synchronized.

In some implementations, the stream buffer engine 206 may be used to synchronize the incoming streams 310 and 320. As described above, the stream analysis engine 202 determines one or more time differences based on the incoming streams. When the time differences are determined, the stream buffer engine 206 can build a buffer for the incoming stream. The size of each buffer may be based on a portion of the stream that corresponding to the respective time difference. The stream processing server 106 can input a respective portion of each of the incoming streams to a respective buffer. Accordingly, by introducing a delay to one or more input streams according to their respective time difference, the streams may be output from the buffers in a synchronized manner relative to each other stream. In addition, the buffers may be adjusted in real-time as changing network conditions affect the amount of lag or delay time (time difference 340) of each stream.

In the example of FIGS. 3A and 3B, the streams 310*a* and 320*a* are incoming streams that are not yet synchronized. After the stream analysis engine 202 determines the time difference 340, the engine 202 can communicate the time difference to the stream buffer engine 206, which can build a respective buffer for one or more of the streams 310*a* and 320*a*. For example, the buffer for the stream 310*a* can have a size corresponding to the time difference 340, such that inputting the stream 310*a* to its respective buffer introduces a delay equal to the duration of the time difference 340. When the streams 310*a* and 320*a* are processed using the stream buffer engine 206, the streams 310*b* and 320*b* of FIG. 3B correspond to the streams output from the buffers. For example, the output stream 310*b* includes a time delay corresponding to the time difference 340.

Figure 3C:
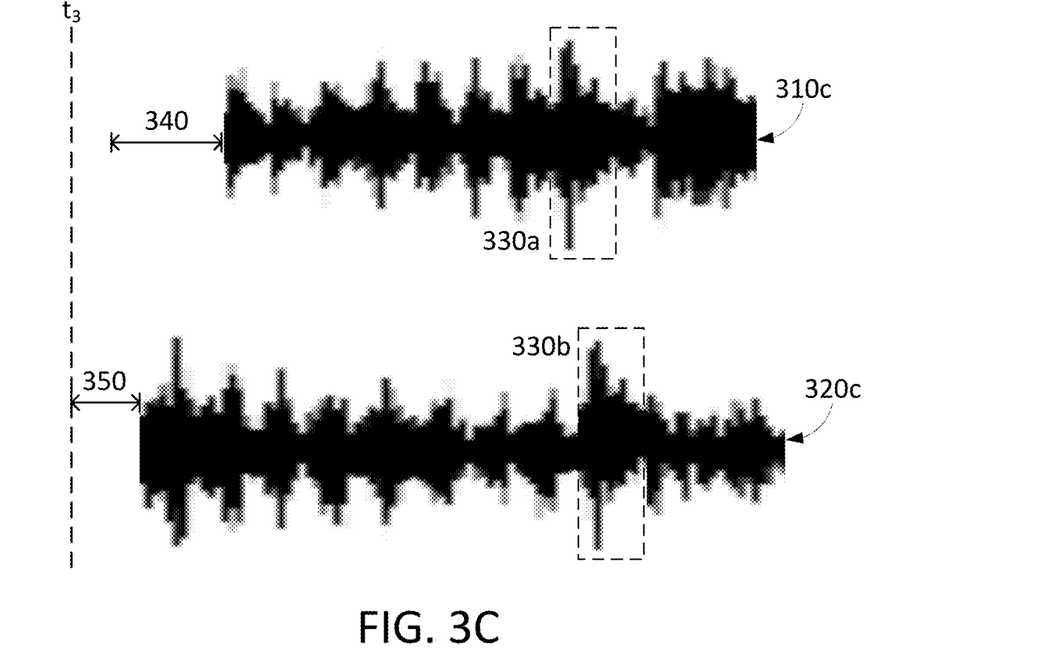
FIG. 3C illustrates alternative exemplary signal patterns associated with two different streams that may be received by a system for intelligent synchronization of media streams.
Figure 3D:
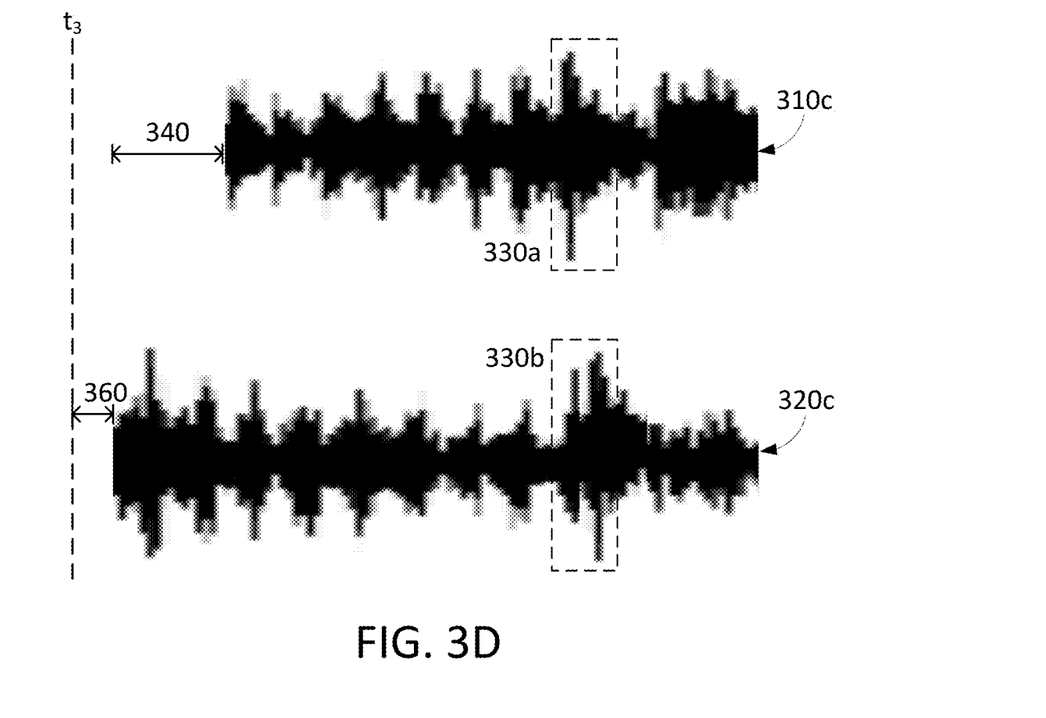
FIG. 3D illustrates exemplary signal patterns associated with the two different streams of FIG. 3C following synchronization by a system for intelligent synchronization of media streams.

FIG. 3C illustrates alternative exemplary signal patterns associated with two different streams that may be received by a system for intelligent synchronization of media streams, and FIG. 3D illustrates exemplary signal patterns associated with the two different streams of FIG. 3C following synchronization by a system for intelligent synchronization of media streams.

In some implementations, stream buffer engine 206 may introduce an additional delay to each of the incoming streams affected by latency drift. For example, network speed can cause latency in the streams received by the stream processing server 106. While the stream processing server 106 may synchronize the received streams at the beginning of the interactive session, the processed streams may drift out of synchronization. As such, without intervention by the stream processing server 106, the streams would no longer be synchronized with one another. The stream processing server 106 can dynamically adjust for this drift in latency by delaying one or more streams even after the streams have been synchronized using the stream cache 204 or the stream buffer 206.

In the example of FIG. 3C, the stream 310*c* is the result of synchronizing stream 310*a* of FIG. 3A, while the stream 320*c* is the result of synchronizing stream 320*a*. For example, the streams 310*c* and 320*c* can be synchronized using the stream cache 204 or the stream buffer engine 206. Although it is possible to synchronize the streams 310*a* and 320*a* with the addition of just the time difference 340, as described with respect to FIGS. 3A and 3B, the addition of another time difference, such as a time difference 350 of FIG. 3C is advantageous at least to dynamically adjust for a latency drift of one or more streams.

In the example of FIG. 3C, the time difference 340 was added to the stream 310*c* to synchronize the stream with the stream 320*c*. The time difference 350, was also added to both streams 310*c* and 320*c*, relative to a time t3. However, due to latency drift, the stream 310*c* lags behind the stream 320*c*, as illustrated in FIG. 3C. To adjust for the latency drift, the stream processing server 106 can decrease the time difference 350, only for the stream 320*c*, and not for the stream 310*c*. For example, FIG. 3D, illustrates processed streams 310*d* and 320*d*, after the correction of the latency drift of FIG. 3C. The time difference 350 is reduced to the time difference 360, relative to the time t3, which resynchronizes the streams 310*c* and 320*c*.

When the stream processing server 106 receives two incoming streams, the stream analysis engine 202 determines a time difference. When there are three incoming streams (e.g., a first, second, and third stream) the stream analysis engine 202 determines up to three time differences (a difference for the first and second streams, a difference for the second and third streams, and a difference for the first and third streams), while four streams yields up to six time differences, and so on. However, in some implementations, the stream analysis engine 202 can determine one or more time differences relative to a single reference stream. For example, when there are three incoming streams, the stream analysis engine 202 can designate the first of the three streams as the reference stream, and determine only two time differences (a difference for the first and second streams, and a difference for the first and third streams). Accordingly, each stream other than the reference stream can be synchronized relative to the reference stream. Such synchronization may occur in real-time and may further be adjusted in real-time as the time difference(s) between the streams are determined to have changed. In some instances, one or more streams may be able to catch up to other associated streams in the session. Such catch-up may be done by skipping directly to an identified point (e.g. associated with a cue or other marker) or gradually skipping (e.g., 1 frame every 10 frames) until synchronization is determined to have been achieved.

In the example of FIG. 2, the stream processing server 106 includes both the stream cache 204 and the stream buffer engine 206. However, as described above, the stream processing server 106 can use either the stream cache 204 or the stream buffer engine 206 to synchronize the incoming streams. Therefore, while in some implementations, the stream processing server 106 includes both the stream cache 204 and the stream buffer engine 206, in other implementations, the stream processing server includes either the stream cache or the stream buffer engine.

Figure 4:
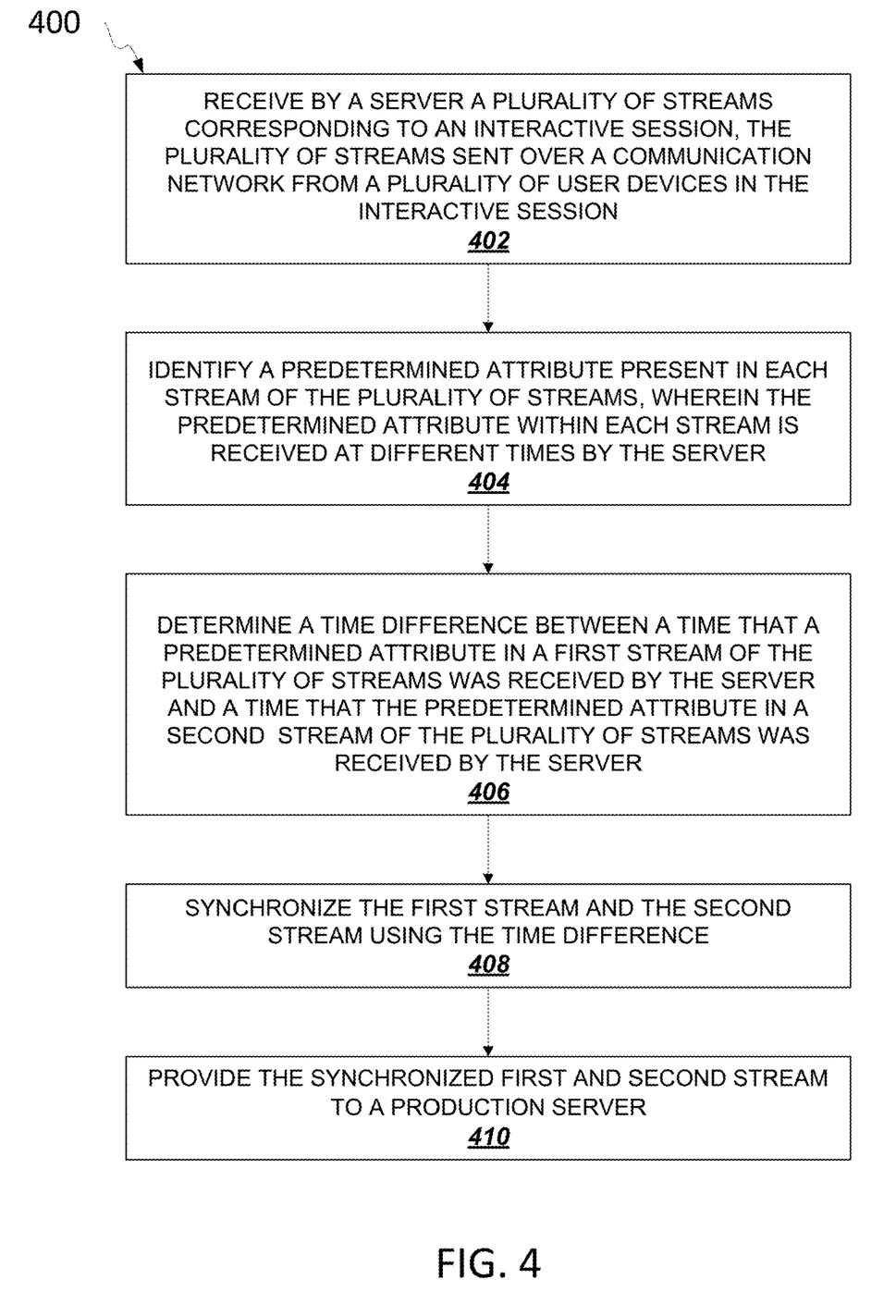
FIG. 4 is a flowchart illustrating an exemplary method for intelligent synchronization of media streams.

FIG. 4 is a flowchart illustrating an exemplary method 400 for intelligent synchronization of media streams. Method 400 may be performed by a server such as stream processing server 106. In step 402, the server receives streams corresponding to an interactive session. The plurality of streams may be sent over a communication network from user devices in the interactive session. For example, the interactive session can be a gaming session, and the process 400 is described with respect to a gaming session. However, in general the interactive session can be any session that transfers data, such as audio or video data, between one or more user devices over a network, such as an online class or conference. The user devices can be gaming consoles or any combination of computing devices that a user can use to participate in the gaming session. In some implementations, the server receives the streams from the user devices, while in other implementations, an additional server acts as a clearinghouse, receiving multiple streams before sending the streams to the server.

In step 404, the server identifies a predetermined attribute present in each stream of the plurality of streams. The predetermined attribute of each stream is received at different times by the server. That is, the streams received by the server may not be synchronized with one another, therefore, the time at which the server receives the predetermined attribute for each stream may be different.

Each of the received streams can include at least one of an audio signal and a video signal. For example, the received streams can include audio provided by a user while that user is participating in the gaming session. As another example, the received streams can include video corresponding to at least a portion of the screen of the user device that is used to participate in the gaming session. The server (e.g., stream analysis engine 202 of the stream processing server 106), analyzes the streams to identify the predetermined attribute, which can include at least one of a visual cue, an audio cue, or an in-game cue. For example, the in-game cue can be an occurrence of an action of a plurality of predefined actions that occur during the interactive session. For example, the action or actions can be specific to the online game, such as players logging into a virtual lobby or chatroom.

In some implementations, the server compares the audio cue to a predetermined audio waveform to identify the predetermined attribute. For example, the predetermined audio waveform can be a sound that is played when a user joins the online game. The server can access a database of predetermined audio waveforms and can compare portions of the audio of the stream to the predetermined audio waveforms of the database.

In step 406, the server determines a time difference between a time that a predetermined attribute in a first stream of the plurality of streams was received by the server and a time that the predetermined attribute in a second stream of the plurality of streams was received by the server.

In some implementations, the predetermined audio waveform can have a wave property that changes in accordance with a time offset from a reference time. The server can determine the time difference using the time offset. For example, the predefined audio waveform can include an inaudible tone present in the audio streams captured from the interactive session. The server can analyze the wave properties of the audio waveform to determine an offset time, relative to a reference time. For example, the reference time can be any time, while the server can determine the offset time based on a lookup table that includes certain wave properties corresponding to discrete time points after the reference time. The server can use the offset time determined for each of multiple received streams to determine a time difference for the multiple streams.

In step 408, the server synchronizes the first stream and the second stream using the time difference, and in step 410, provides the synchronized first and second stream to a recipient device. For example, in some implementations, synchronizing the first stream and the second stream includes using a stream buffer, while in some implementations, synchronizing the first stream and the second stream includes writing and reading the streams to and from a memory such as a stream cache.

In some implementations, synchronizing the first stream and the second stream using the time difference includes providing a buffer for at least one of the first stream and the second stream. For example, a stream buffer engine of the server can provide the buffer. The buffer can take as input a stream and generate as output a modified version of the input stream, which includes a time delay. The size of the buffer can correspond to an amount of time that a stream input to the buffer should be delayed. For example, the size of buffer can correspond to the time difference, such that the server can input one of the first stream and the second stream to the buffer to introduce a delay equal to the time difference, therefore synchronizing the first and second streams. Providing the first and second stream to the production server includes providing the output of the buffer, including the synchronized first and second streams, to the production server.

In some implementations, the server determines whether to synchronize the streams using the buffer approach or using the memory approach based on available computing resources. For example, while the server may use either method to perform the synchronizing, using a memory, e.g., a stream cache, may require more computing resources, such as random access memory (RAM), as compared to using one or more buffers. Therefore, if memory space is scarce, the server may use the buffer approach rather than the memory approach.

Figure 5:
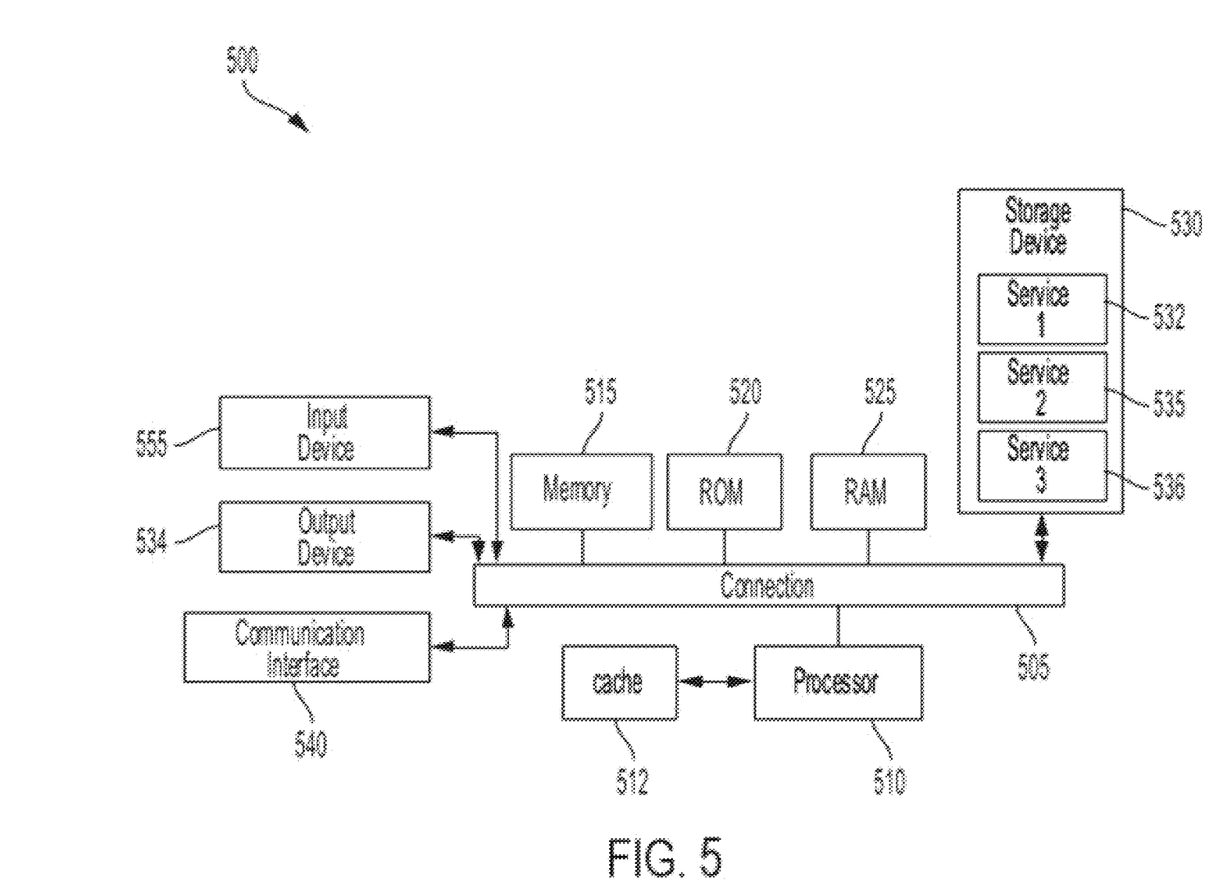
FIG. 5 is a block diagram of an exemplary computing device for implementing aspects of the present technology.

FIG. 5 is a block diagram of an exemplary computing device for implementing aspects of the present technology. Computing system 500, which can be, for example, any computing device making up the user devices (e.g., user devices 112A-112N), the spectator devices (e.g., spectator devices 204A-204N), or the game control system 102, and any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 535, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 555, which can represent any number of input mechanisms, such as a microphone for speech, a touch-sensitive screen for gesture or graphical input, keyboard, mouse, motion input, speech, etc. Computing system 500 can also include output device 534, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 534, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for stream synchronization, the method comprising:
    receiving a plurality of streams at a server, the streams corresponding to an interactive session and sent over a communication network from a plurality of user devices in the interactive session;
    identifying a predetermined attribute present in each of the streams, wherein the predetermined attribute within each stream is received by the server at different times;
    determining a time difference between a time that a predetermined attribute in a first one of the streams was received by the server and a time that the predetermined attribute in a second one of the streams was received by the server;
    synchronizing the first stream and the second stream using the time difference, wherein the predetermined attribute within the first stream is synchronized to the predetermined attribute in the second stream; and
    providing the synchronized first and second stream over the communication network to a recipient device.

2. The method of claim 1, wherein each of the streams includes at least one of an audio signal and a video signal, and wherein the predetermined attribute includes at least one of a visual cue or an audio cue.

3. The method of claim 1, wherein the predetermined attribute includes an in-game cue corresponding to an occurrence of one or more in-game events during the interactive session, and wherein identifying the predetermined attribute includes detecting the occurrence based on game data in the respective stream.

4. The method of claim 1, wherein identifying the predetermined attribute includes comparing an audio waveform of the respective stream to a predetermined audio waveform.

5. The method of claim 4, wherein the predetermined audio waveform has a wave property that changes in accordance with a time offset from a reference time, wherein determining the time difference is based on a time offset for the first stream and a time offset for the second stream.

6. The method of claim 5, further comprising introducing an audio signal corresponding to the predetermined audio waveform into the interactive session.

7. The method of claim 1, wherein the predetermined attribute corresponds one or more in-stream events, and wherein identifying the predetermined attribute includes detecting the in-stream events based on metadata in the respective stream.

8. The method of claim 1, wherein synchronizing the first stream and the second stream using the time difference includes providing a buffer for at least one of the first stream and the second stream, wherein a size of the buffer corresponds to the time difference.

9. The method of claim 1, wherein synchronizing the first stream and the second stream using the time difference comprises:
    writing a portion of the first stream or the second stream to a memory, wherein the portion corresponds to the time difference; and
    reading the portion from the memory after a time period corresponding to the time difference.

10. The method of claim 1, further comprising:
    applying artificial intelligence to detect a common pattern in the streams;
    identifying at least a part of the pattern as a new predetermined attribute; and
    storing the new predetermined attribute in memory, wherein the new predetermined attribute is used to synchronize streams in a subsequent interactive session.

11. A system for stream synchronization comprising:
    a communication interface that receives a plurality of streams, the streams corresponding to an interactive session and sent over a communication network from a plurality of user devices in the interactive session;
    a processor that executes instructions stored in memory, wherein the processor executes the instructions to:
        identify a predetermined attribute present in each of the streams, wherein the predetermined attribute within each stream is received at different times;
        determine a time difference between a time that a predetermined attribute in a first one of the streams was received and a time that the predetermined attribute in a second one of the streams was received by the server; and
        synchronize the first stream and the second stream using the time difference, wherein the predetermined attribute within the first stream is synchronized to the predetermined attribute in the second stream, and
    wherein the communication interface provides the synchronized first and second stream over the communication network to a recipient device.

12. The system of claim 11, wherein each of the streams includes at least one of an audio signal and a video signal, and wherein the predetermined attribute includes at least one of a visual cue or an audio cue.

13. The system of claim 11, wherein the predetermined attribute includes an in-game cue corresponding to an occurrence of one or more in-game events during the interactive session, and wherein the processor identifies the predetermined attribute by detecting the occurrence based on game data in the respective stream.

14. The system of claim 11, wherein the processor identifies the predetermined attribute by comparing an audio waveform of the respective stream to a predetermined audio waveform.

15. The system of claim 14, wherein the predetermined audio waveform has a wave property that changes in accordance with a time offset from a reference time, wherein the processor determines the time difference based on a time offset for the first stream and a time offset for the second stream.

16. The system of claim 15, wherein the processor executes further instructions to introduce an audio signal corresponding to the predetermined audio waveform into the interactive session.

17. The system of claim 11, wherein the predetermined attribute corresponds one or more in-stream events, and wherein the processor identifies the predetermined attribute by detecting the in-stream events based on metadata in the respective stream.

18. The system of claim 11, further comprising memory, wherein the processor synchronizes the first stream and the second stream using the time difference by providing a buffer in the memory for at least one of the first stream and the second stream, wherein a size of the buffer corresponds to the time difference.

19. The system of claim 11, further comprising memory, wherein the processor synchronizes the first stream and the second stream using the time difference by:
    writing a portion of the first stream or the second stream to the memory, wherein the portion corresponds to the time difference; and
    reading the portion from the memory after a time period corresponding to the time difference.

20. The system of claim 11, further comprising memory, wherein the processor executes further instructions to:
    apply artificial intelligence to detect a common pattern in the streams; and
    identify at least a part of the pattern as a new predetermined attribute;
    wherein the memory stores the new predetermined attribute, and wherein the new predetermined attribute is used to synchronize streams in a subsequent interactive session.

21. A non-transitory machine-readable storage medium having instructions embodied thereon, the instructions executable by a processor to perform a method, the method comprising:
    receiving a plurality of streams at a server, the streams corresponding to an interactive session and sent over a communication network from a plurality of user devices in the interactive session;
    identifying a predetermined attribute present in each of the streams, wherein the predetermined attribute within each stream is received by the server at different times;
    determining a time difference between a time that a predetermined attribute in a first one of the streams is received by the server and a time that the predetermined attribute in a second one of the streams was received by the server;
    synchronizing the first stream and the second stream using the time difference, wherein the predetermined attribute within the first stream is synchronized to the predetermined attribute in the second stream; and
    providing the synchronized first and second stream over the communication network to a recipient device.

* * * * *